June 1, 1965  J. D. MALLORY  3,186,080
CHUCK APPARATUS
Filed Oct. 25, 1962
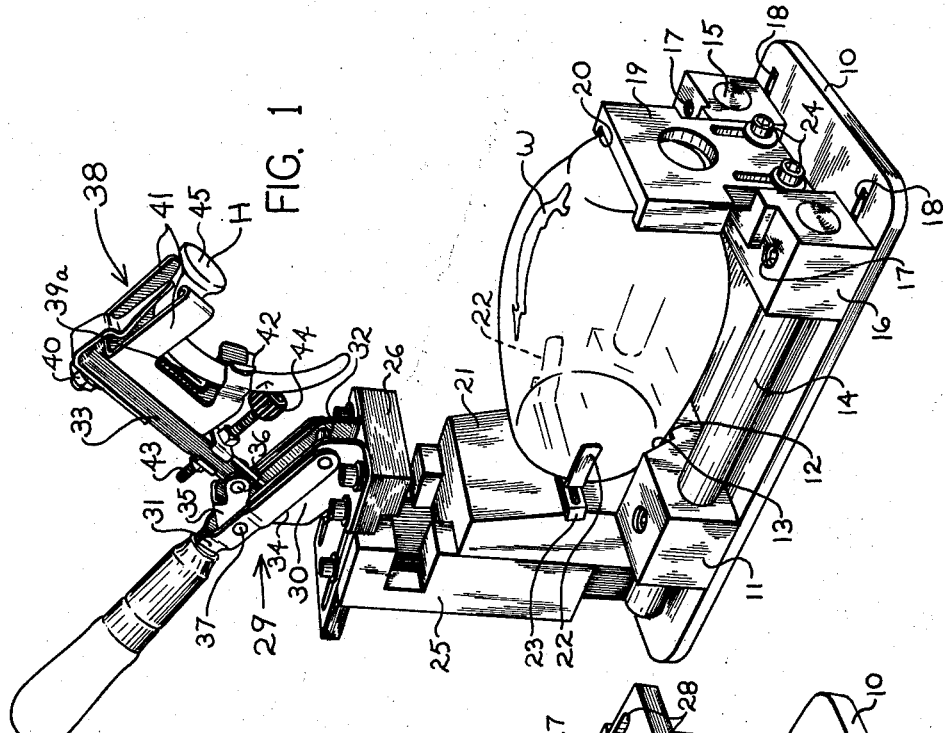
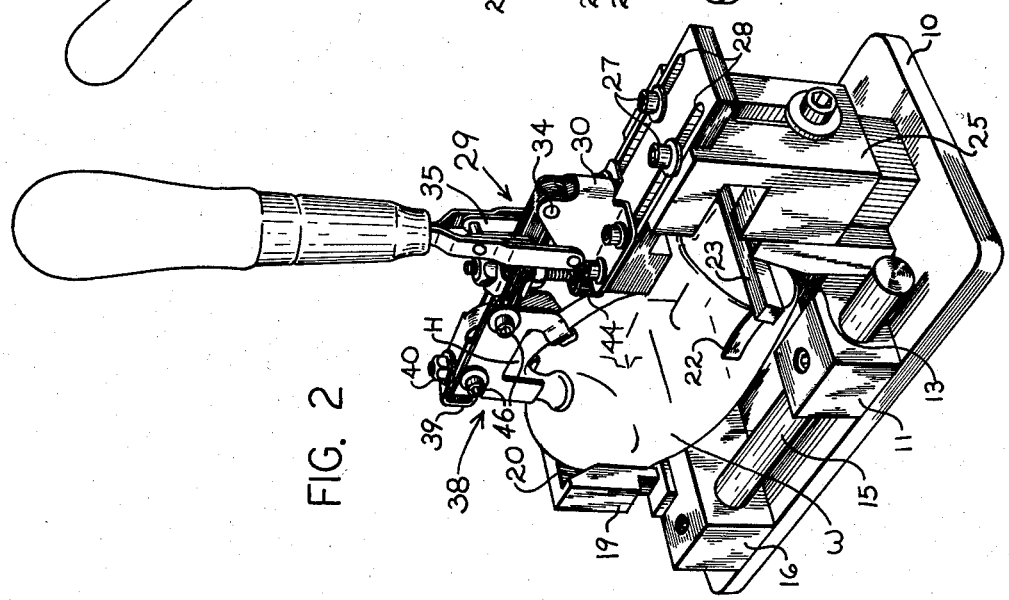
INVENTOR.
JAMES D. MALLORY
BY
ATTORNEYS United States Patent Office 3,186,080
Patented June 1, 1965

3,186,080
CHUCK APPARATUS
James D. Mallory, Maumee, Ohio, assignor to Owens-Illinois Glass Company, a corporation of Ohio
Filed Oct. 25, 1962, Ser. No. 233,122
4 Claims. (Cl. 29—238)

This invention relates to apparatus for supporting and locating a glass article to which a glass handle is to be attached.

This invention further relates to apparatus for supporting a glass article and for applying a handle thereto in predetermined relationship. More particularly, this invention relates to apparatus in the form of a chuck for holding a glass article and for holding a glass handle and for moving the handle into predetermined orientation with respect to the tumbler, it being understood that, in effect, the handle is to be glued to the side wall of the tumbler.

It has been the practice in the past to attach glass handles to tumblers or other glass articles by reheating a portion of the article or handle so as to form a weld between the handle and the article. However, with the development of epoxy resins, it is now feasible to attach handles to glass articles by applying a small quantity of resin to the area of the article to which a handle is to be attached and then holding the handle in specifically oriented relationship with respect to the article until the drying or curing of the resin is complete to form a tight bond between the handle and the article. Obviously, this process is much simpler and cheaper than welding handles to articles by remelting the glass and also there is no chance of causing distortion in the article or the handle, inasmuch as both the handle and ware are relatively cold during the attaching process.

With the foregoing in mind, it is an object of this invention to provide apparatus for holding a glass article and handle in first, spaced-apart relationship, and then in contact with each other by a relatively simple convenient chucking apparatus.

It is an additional object of the invention to provide handle attachment apparatus which is convenient to operate and does not require a great amount of skill or attention by the operator.

It is a still further object of this invention to provide a chuck for supporting a handle and article to which the handle is to be applied in specific relationship to each other and operable to move the handle into precise predetermined alignment with the side wall of the article.

Other and further objects will be apparent from the following description taken in conjunction with the annexed sheet of drawings, wherein;

FIG. 1 is a perspective view of the apparatus of the invention illustrating the handle holding mechanism in retracted position; and FIG. 2 is a perspective view of the apparatus of FIG. 1 turned through 180° and illustrating the positioning of the handle in engagement with the tumbler.

Referring now to the drawings, the chucking apparatus of the invention generally comprises two parts, one being the tumbler locating and holding part, and the other being the handle holding and applying part. Both parts are mounted on a base 10 which takes the form of a generally flat member. A block 11 is fixed to the base 10 and extends generally the full width of the base 10. The block 11 has a cut-out portion 12 intermediate its length with the cut-out having tapered side walls 13 against which the side wall of a tumbler or article is adapted to abut. The tapered walls 13 define or locate the axial position of the open end of the tumbler in relation to the base. The block 11 has horizontal cylindrical openings therethrough adjacent its end and within which rods 14 and 15 are adapted to slide. The rods 14 and 15 extend into openings formed in a second block 16 and are fixed thereto by set screws 17. The block 16 extends substantially the full width of the base 10 and has keys or studs (not shown) on its undersurface which cooperate with key-ways 18 formed in the upper surface of the base 10. The key-ways 18 insure that any movement of the block 16 will be limited to straight-line motion with respect to the length of the base 10. The block 16 has fastened thereto a vertically extending member 19 which serves as the positioning or locating member for the bottom of the tumbler or ware W. The face of the member 19 is cut out, as shown in FIG. 2 at 20, so as to receive the base or bottom of the tumbler and align the tumbler axis with the length of the base 10.

A generally vertically extending member 21 has a pair of horizontally adjustable spring clip members 22 connected thereto which are adapted to embrace the side walls of the tumbler W at the open end thereof, somewhat above the diameter of the tumbler W. In this manner the clips 22 serve to hold the open end of the tumbler W against the tapered walls 13 of block 11, and a mounting block 23, which carries the clips 22, defines the forward position of the tumbler W. Thus it can be seen, with the particular arrangement of the blocks 11 and 16 and the base locating member 19, the tumbler W will be placed in a fixed position relative to the base 10. Obviously, the operator may place the tumbler W in the position shown in the drawings merely by pushing the tumbler W down against the surfaces 13 and the surface provided in the member 19. The member 19 is connected to the block 16 by bolts 24 which extend through vertical slots formed in the member 19. In this manner the vertical position of the member 19 in relation to the base 10 may be adjusted to accommodate ware of varying sizes. It should be understood that once the length of the tumbler is determined, the block 11 and rods 14 and 15 will be locked together.

Adjustably mounted on the member 21 is a vertically extending block 25 with the upper portion of the block 25 supporting a horizontal arm 26. The arm 26 may be adjusted relative to the block 25 by reason of the fact that it is connected to the block 25 by means of bolts 27 which extend through elongated slots 28 formed therethrough. The arm 26 has a toggle mechanism, generally designated 29, fixed to its upper surface. The toggle mechanism 29 is comprised of a base portion 30 formed with two generally vertically extending parallel plates. A fork-like handle member 31 is pivoted to the base 30 by a pivot pin 32. An arm 33, which forms the toggle arm, is pivotally connected to the base 30 at 34. A toggle link 35 is pivotally connected to the arm 33 at 36 and to the handle 31 at 37. Thus it can be seen that movement of the handle 31 from the position shown in FIG. 1 to the position shown in FIG. 2 will result in pivoting the arm 33 about the pivot point 34.

The arm 33 carries a handle locating and clamping mechanism generally designated 38 fastened thereto at 46 and extending below its undersurface. The locating means comprises a finger-like member or bracket 39 bolted at 40 to the arm 33 with a portion thereof extending generally at right angles to the length of the arm 33. This portion defines and limits the positioning of a handle H in one direction, when the handle is applied to the clamping mechanism 38. The actual clamping mechanism is comprised of a member having two spring steel arms 41 which are adapted to engage the handle H near the base portion thereof and, due to the resiliency of the arms 41, the handle H will be frictionally retained by the arms 41 in the position shown in FIG. 1. The mechanism 38 also includes a second pair of resilient arms 42 which take the configuration of a spring clip, as can be seen when viewing FIG. 1, with the outer ends of the arms 42 being bent outwardly so as to permit easy insertion of the handle between the arms. The handle, as shown in FIG. 1, is generally C-shaped and a relatively flat spring member 39a, extending parallel to the undersurface of arm 33 in the area between arms 41 and 42, serves to limit the extent of insertion of the handle H into the resilient arms 41 and 42. Furthermore, it should be noted that the arms 42 define an area therebetween which is greater than the diameter of the handle so that the handle is not actually held rigidly by the arms 42. However, the bent end portions of the arms 42 are spaced apart less than the diameter of the handle H and primarily serve to retain the handle against pivotal movement with respect to arms 41. A further locating member takes the form of a screw 43 which extends through an opening in the arm 33. The member 43 may be adjusted with respect to the arm 33. The downwardly extending end of the member 43 has a resilient pad 44 fixed thereto. The pad 44 serves as a locating member for one end of the handle H when applied to the mechanism 38. The configuration of the clamp for holding the handle, in effect, permits the handle to pivot between the arms 41, which are frictionally engaged therewith. It should be remembered that the arms 41 are planar, in the sense that they present straight surfaces to the handle H and that the handle is generally circular in cross-section. Thus, the arms 41 contact the handle H at generally diametrically opposed points. It is about the axis defined by these points that the handle would normally be permitted to pivot to a limited extent. Obviously, the member 39 limits the position of the handle in one direction, namely, to the right, as shown in FIG. 1. The clip member defined by the arms 42, by reason of its configuration, normally would only loosely retain the curved portion of the handle H and prevent its pivoting from the general area defined by the arms 42 of the clamp. However, by reason of the fact that the resilient pad 44 is positioned so that it contacts the back of the handle H when the handle is applied to the mechanism 38, the arms 42 serve to bias the handle in a clockwise direction and retain the curved portion of the handle H in firm contact with the pad 44. In this manner the handle H is located within the mechanism 38 in a precise relationship. Precise locating of the handle is necessary because the handle, when applied to the ware W, must present its attaching surface 45 parallel to the side of the ware. The surface 45, in the specific embodiment shown, is concave so as to be parallel to the concave surface of the ware to which it is attached.

In the use of the apparatus of the invention the operator will place the tumbler W into the predetermined location defined by the base orienting member 19 and the open end orienting members 11 and 21. When placed in the position shown in FIG. 1, the spring clips 22 insure that the tumbler will not be inadvertently jarred out of the specific location in which it is placed. At the same time the operator will place a handle into the mechanism 38 and only need be careful that the handle contact the member 39 and the resilient pad 44. With the handle thus positioned in the mechanism 38, a drop of resin or other suitable material is placed on the side wall of the tumbler W at the location where the handle is to be applied. The toggle mechanism is then actuated by the movement of its handle 31 from the position shown in FIG. 1 to the position shown in FIG. 2, thus applying the handle H to the tumbler W with the glue or resin forming a bond therebetween. It is not necessary that a great amount of force be applied in placing the handle against the tumbler W; only sufficient force to insure that the glue covers the area of the handle H in contact with the ware.

It should be understood that, depending on the nature of the resin or glue being used, it would be equally possible to apply the resin to the handle H before it is moved into the position shown in FIG. 2. However, this invention is primarily concerned with apparatus for holding the ware and the handle and for placing the two parts together in a particular manner which is capable of retaining this assembled position for a time sufficient to permit the resin to harden and for the bond to be cured. It is extremely important in this type of a glass to glass seal that the parts be precisely oriented with respect to each other in order to insure that a good seal will be accomplished.

Various modifications may be resorted to within the spirit and scope of the appended claims.

I claim:

1. A chuck for supporting a handle and article to which the handle is to be applied comprising, a base, article locating members connected to said base and extending generally vertically therefrom, an elongated arm mounted on said base, said arm adapted to pivot in a plane parallel to the longitudinal axis of the article into substantially horizontal, overlying relationship with respect to the article and base, a clamp for supporting and orienting a generally C-shaped handle comprising, two pairs of spaced apart spring-like members extending parallel to each other and having handle engageable faces at the ends thereof, means for connecting said clamp to said extending arm, first locating means connected to said arm and extending into the area between one pair of said spring-like members to limit the positioning of a handle placed in said clamp in a first direction, second locating means fixed to said arm and extending downwardly therefrom adapted to abut a handle to limit the position of the handle in the clamp in a direction opposite to said first direction and means connected to said arm for moving said arm to place a handle into abutting relationship with respect to the article.

2. A chuck for supporting a handle and article to which the handle is to be applied comprising, a base, an article bottom locating member connected to said base and extending generally vertically therefrom, an article top locating member connected to said base and extending generally vertically therefrom and spaced from said first-mentioned member a distance equal to the height of the article, means connected to said top locating member for retaining an article in contact with said locating members, and having an elongated arm pivotally mounted on said base, said arm adapted to pivot in a plane parallel to the longitudinal axis of the article into substantially a horizontal overlying relationship with respect to the article and said base, a handle supporting clamp connected to said extending arm, a bracket connected to said arm and having a portion thereof extending at right angles to the direction of said arm for limiting the position of a handle placed in the clamp, an elongated member extending through an opening in said arm, a resilient pad fixed to one end of said member, said pad being adapted to contact a handle placed in said clamp for orienting the handle with respect to said clamp and means connected to said arm for moving said arm to place a handle into abutting relationship with respect to the article.

3. A chuck for supporting a handle and article to which the handle is to be applied comprising, a base, a pair of generally vertically extending members mounted on said base and spaced from each other a distance equal to the height of the article, an elongated arm pivotally mounted on said base, said arm adapted to pivot in a plane parallel to the longitudinal axis of the article into substantially horizontal overlying relationship with respect to the article and base, a handle clamp comprising, a pair of spring-like members extending parallel to each other and having clamping faces at the ends thereof, a second pair of spring-like members extending in the same direction as said first two members and having a configuration so as to retain a handle loosely therein, means connecting said clamp to the extending end of said arm, a bracket connected to said arm and having a portion thereof extending at right angles to the direction of said arm and located adjacent the area between said first two spring-like members, said bracket serving as a locating member for a handle placed in said clamp, a screw-like member extending through an opening in said arm, a resilient pad fixed to one end of said screw-like member, said pad being adapted to orient a handle placed in said clamp in particular relationship with respect to said clamp and means connected to said arm for moving said arm to place a handle into abutting relationship with respect to the article.

4. A chuck for supporting a handle and article to which the handle is to be applied comprising, a base, an article bottom locating member connected to said base and extending generally vertically therefrom, an article top locating member connected to said base and extending generally vertically therefrom and spaced from said first-mentioned member a distance equal to the height of the article, a toggle mechanism mounted on said base and having an elongated arm extending therefrom, said arm adapted to pivot in a plane parallel to the longitudinal axis of the article into substantially horizontal, overlying relationship with respect to the article and said base, a clamp, said clamp comprising a first pair of spring-like members extending parallel to each other and having clamping faces at the ends thereof, a second pair of spring-like members extending in the same direction as said first two members and having a configuration so as to retain a handle loosely therein, said clamp being fixed in relation to the undersurface of said extending arm, a bracket connected to said arm and having a portion thereof extending at right angles to the length of said arm, located in the area between said first two spring-like members and defining a locating member for a handle placed in said clamp, a screw-like member extending through an opening in said arm, a resilient pad fixed to one end of said screw-like member, said pad being adapted to orient a handle placed in said clamp in particular relationship with respect to said clamp and means connected to said arm for moving said arm to place a handle carried thereby into abutting relationship with respect to the article.

References Cited by the Examiner

UNITED STATES PATENTS 2,440,479    4/48    Lang _____ 1—331

ROBERT C. RIORDON, *Primary Examiner.*